United States Patent [19]

Reilly

[11] 3,765,659
[45] Oct. 16, 1973

[54] GAS SCRUBBER
[76] Inventor: Bertram B. Reilly, 17 Briar Cliff, Pittsburgh, Pa. 15202
[22] Filed: Jan. 17, 1972
[21] Appl. No.: 218,250

[52] U.S. Cl. ............. 261/109, 261/111, 261/114 R, 261/116, 55/240
[51] Int. Cl. ............................................. B01f 3/04
[58] Field of Search ..................... 55/240; 261/109, 261/111, 114, 116

[56] References Cited
UNITED STATES PATENTS
| | | | |
|---|---|---|---|
| 2,234,385 | 3/1941 | Ryner | 261/113 |
| 3,143,482 | 8/1964 | McLeod et al. | 261/114 R |
| 3,162,699 | 12/1964 | Sivyer | 261/114 R |
| 3,233,881 | 2/1966 | Smith | 261/114 R |

Primary Examiner—Tim R. Miles
Assistant Examiner—Steven H. Markowitz
Attorney—William H. Parmelee

[57] ABSTRACT

A gas cleaning apparatus for removing particulate matter from gases which is of the type having a vertical passage through which the gases flow upwardly with water-containing trays across the passage at spaced levels, has each tray formed with a perforate bottom and an impingement plate spaced a short distance above the bottom, the tray bottom and impingement plate each having holes therethrough through which the gases pass. The holes in the impingement plate are slightly larger than those in the bottom and so staggered that the holes of the bottom are under solid areas of the impingement plate. There are spray nozzles under the trays at each level for cleaning them. The holes through the bottom and the impingement plates of each tray are of progressively smaller area than the corresponding holes in the trays beneath, but the number of holes in the corresponding parts of each tray increases upwardly above the bottom one so that the total area of the openings through the elements of the trays at each level is substantially the same.

3 Claims, 5 Drawing Figures

Patented Oct. 16, 1973 3,765,659
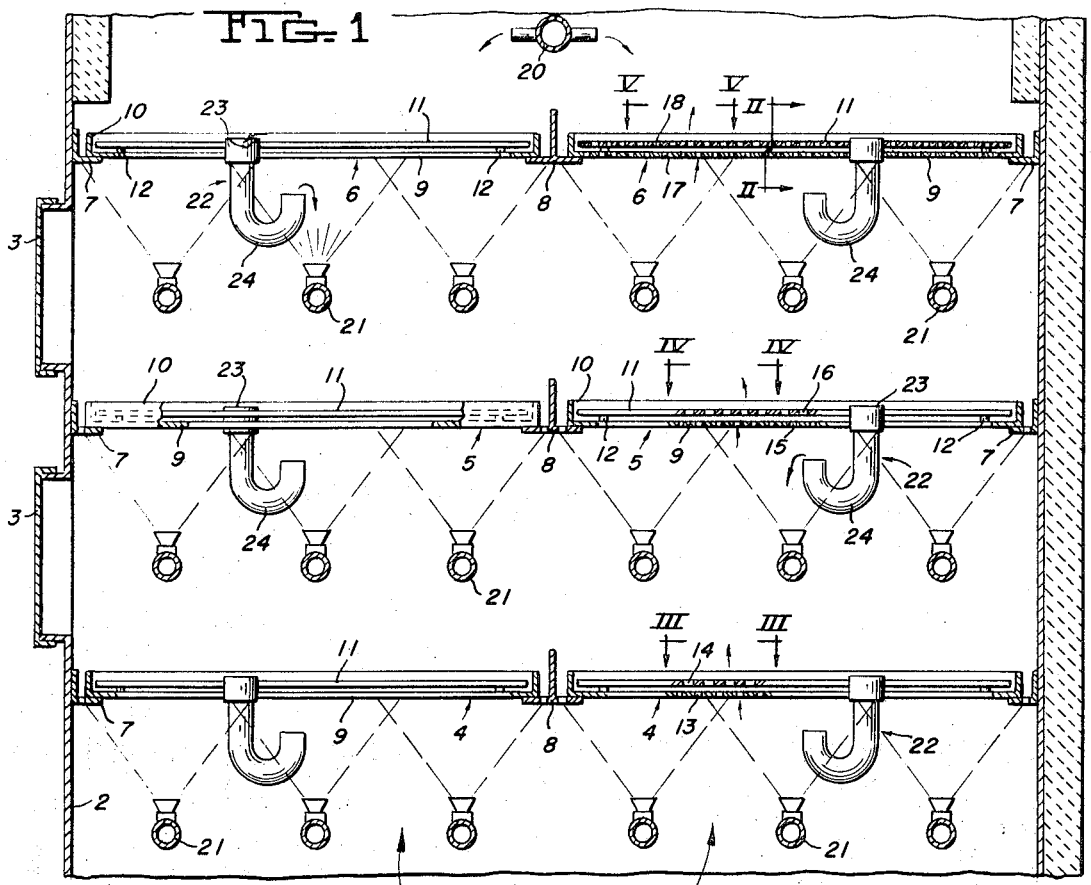
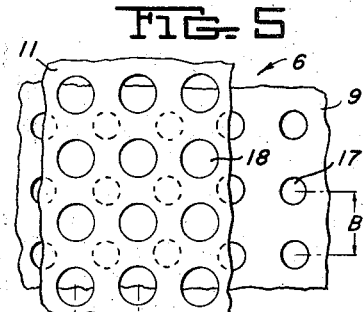
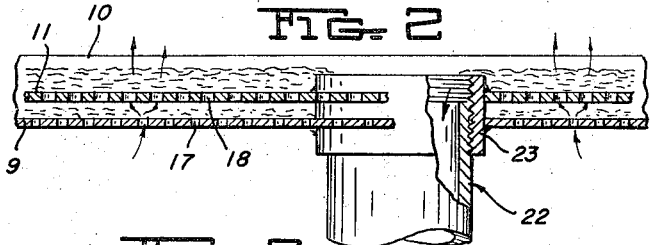
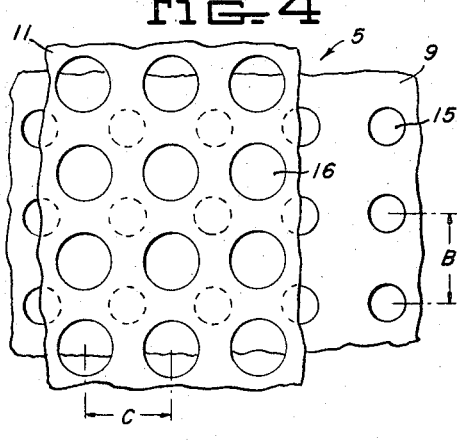
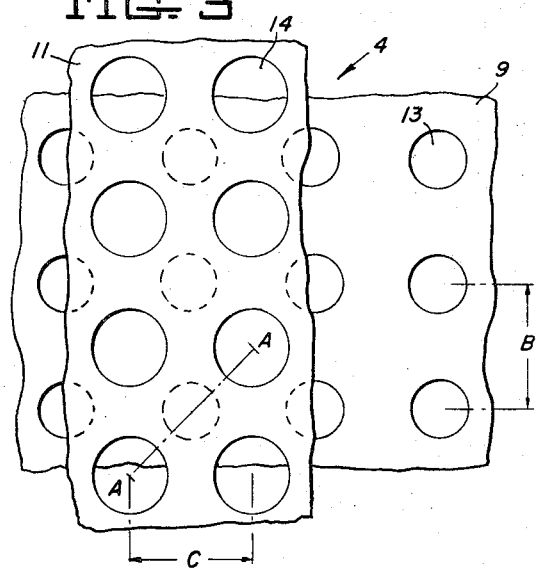

GAS SCRUBBER

This invention relates to the removal of particulate matter from gases, and is for a scrubber of the general type wherein the gases to be cleaned flow upward through a succession of perforate water-containing trays arranged one above the other, and so arranged that the gases and water are brought into intimate contact.

The invention is especially designed for use in removing tiny particulate solids which predominantly range downwardly from around 50 microns in size from gases generated in the burning of municipal waste in an incinerator, and will be herein so described for purposes of illustration and without excluding other fields of use to which it is applicable.

U.S. Pat. No. 2,234,385 to Ryner, of Mar. 11, 1941 shows one type of gas washer to which this invention pertains, wherein gases to be cleaned pass upwardly through the perforate bottom of a water-retaining tray, then contact a perforated plate spaced a slight distance above the perforate bottom of the tray. More recently washers of this type have been constructed wherein the gases to be cleaned also flow upwardly through a tray wherein there are in effect two plates, the lower one of which is the bottom of the tray and the second one is normally spaced about three-eighths of an inch above the first. Both have holes therethrough with the ones in the lower plate being smaller than those in the upper one and being positioned out of line with those in the upper one so that a solid or "target" area of the upper plate is directly above an opening in the lower one. In some cases the upper plate has been replaced with strips with spaced fin-like extensions forming target areas over the holes in the tray bottom.

Spray nozzles below the tray project a fine spray of water against the underside of the tray while the tray itself is flooded to a level above the upper plate with water. Water is retained in the perforate trays largely by the upflow of gases through the perforations. The efficiency of such a tray is due to the theory that where the jet of gas or air passes through a hole in the lower plate of such a tray, it in effect shears a film of water around the edge of the opening, creating a condition of turbulence that brings small, even micron and submicron particles of particulate matter into violent contact in a mist-like dispersion of water conducive to their coherence, and this turbulence is increased by the impingement of each jet against the target area immediately above.

While an important purpose of the spray nozzles below the tray is to constantly wash the underside of the tray, a deposit of solids nevertheless tends to build up around the holes of the lower plate, so that there is a practical limit on the size of the holes, because small holes will easily become clogged with a build-up of such deposit, notwithstanding the provision of the sprays.

It has heretofore been proposed to provide in a scrubber two or more such trays, one above another through which the gases pass in succession with the expectation that particles that were not removed from the gases in passing through the first tray would likely be trapped in the second or third tray, but this has not proved to be nearly as effective as expected.

According to the present invention there is also provided a scrubber comprised of a series of two or more, preferably at least three, trays of this type, but the holes in the lower plates or tray bottoms at each level from the bottom up are of progressively decreasing diameter but of increasing number so that while the areas of the individual holes decreases, the open area through the trays at each level is approximately the same. With smaller holes spaced at closer intervals, the target areas above each hole must be rearranged to provide in effect smaller areas at closer intervals. This is most economically accomplished with the upper plate of the tray at each level also having smaller holes than those in the corresponding plate next below, but still larger than the holes in the tray in which the plate is located. With the trays thus formed the pressure drop through the apparatus is, for practical purposes, the same or about the same as where the holes in all trays are alike. However, it is possible to use smaller holes in the successive trays because the gases become successively cleaner and the sprays will be effective to remove the muck at the lower rate of accumulation on the upper trays. At the same time, since the effectiveness of the trays in bringing about the agglomeration of tiny particles to a size in which they will be deposited depends largely on the so-called shearing action above explained produced by the gases jetting through the openings of the tray bottom, and this shearing action in turn is a function of the peripheral dimension of the openings, it will be seen that many small openings will provide a greater total shearing edge than a fewer number of larger holes, even though the total open area in the tray bottoms at different levels in each case is about the same. This invention therefore combines the effectiveness of smaller openings with the non-clogging advantages of the larger holes. At the same time the pressure drop across the inlet and outlet sides of the scrubber is not effectively different from a multiple tray scrubber having the same sizes of openings in all trays.

The invention may be more fully understood in conjunction with the accompanying drawing showing a preferred embodiment of the invention, and wherein:

FIG. 1 is a vertical transverse section through a scrubber of a generally rectangular shape having three sets of trays, one set being positioned above another;

FIG. 2 is a typical fragmentary vertical section through a portion of a typical single tray, the view being on a larger scale than FIG. 1, but in the plane of line II—II of FIG. 1;

FIG. 3 is a fragmentary plan view of the upper and lower plates of the lower tray with the upper plate broken away to show the underlying lower one;

FIG. 4 is a similar view of the upper and lower plates of the middle tray; and

FIG. 5 is a view similar to FIGS. 3 and 4 of the upper and lower plates of the uppermost tray.

The scrubber of the present invention is generally positioned in the path of flow of combustion gases between the customary spray washers which remove most of the larger and more easily trapped solids in the flue gases and the stack, and in a position where the gases will have been cooled to a considerable extent. Looking at FIG. 1, the furnace gases enter the apparatus at the bottom and leave at the top, the direction of flow being indicated by the arrow at the bottom of the figure.

The scrubber as here shown has a metal casing 2 which is generally rectangular in shape with access doors 3 therein. Within the casing are a plurality, usually at least three, vertically spaced series of trays, the bottom one being designated generally as 4, the middle one 5, and the top one 6. In the construction here shown, trays at each level are rectangular in shape. Each is supported at one end on a ledge 7, one of which is along each of two opposite side walls of the casing, and at the other end of the oppositely-extending flanges of a longitudinally extending inverted T-bar 8.

The general construction of each tray is identical except for the specific differences hereinafter noted. Each has a flat plate 9 forming the bottom of the tray and each such flat bottom has an upturned peripheral flange 10. Spaced above the lower plate or tray bottom and below the level of the top of the flange 10 there is an upper plate 11, sometimes called an impingement plate. Spacers holding the two plates apart are indicated at 12. The upper or impingement plate of each tray has holes therethrough, with the holes of the lower plate being offset from the holes of the upper plate in such manner that the holes of the lower plate are under a solid area of the upper plate. This arrangement of the holes of the two plates is shown in FIGS. 3, 4 and 5. Water is retained on the bottom 9 of the tray to a depth which covers the impingement plate 11, and the lower trays may even overflow the sides of the tray and drain through small openings in members 7 and 8.

In the lowermost tray or trays, designated generally as 4 (see FIG. 3), the tray bottom 9 typically has holes designated 13 which are three-sixteenths of an inch in diameter therethrough while its impingement plate has holes designated 14 of nine thirty-seconds of an inch in diameter therethrough. The holes of the tray bottom are centered on a diagonal center line (as A—A) between two upper holes and the center-to-center distance (as B) between the holes in the bottom is seven-sixteenths of an inch, and this is the same as the center-to-center distance C between the holes of the impingement plate.

In the middle tray 5 (see FIG. 4) the holes 15 in the lower plate or tray bottom and the holes 16 of the upper or impingement plate are similarly offset, but typically the holes of the lower plate are one-eighth of an inch in diameter and the ones in the upper plate three-sixteenths of an inch in diameter. Here the center-to-center distances B and C are five-sixteenths of an inch.

The same offset arrangement of the holes in the lower and upper plates is followed in the uppermost tray 6, as shown in FIG. 5. Here, however, the holes 17 in the lower plate are typically three thirty-seconds of an inch in diameter and the holes 18 in the upper plate are nine sixty-fourths of an inch in diameter. The dimensions B and C are each seven thirty-seconds of an inch.

With this variation in hole diameter and center-to-center spacing, the number of holes in the bottoms of the middle tray or trays 5 will be more than the number of holes in the plates of the lowermost tray, but less than the number of holes in the plates of the uppermost tray. However the total open area through lower plates 9 of trays 4, 5 and 6 will be approximately the same. To provide target surfaces over each hole in a tray bottom the total area of the holes in the impingement plates 11 of trays 4, 5 and 6 will be about the same. So arranged, the pressure drop of gases flowing through each tray will be approximately the same, some allowance being made for the increase in resistance offered by the provision of the smaller holes. Since the effectiveness of the cleaning action of the gases in passing through the trays is a function of the so-called shearing action of the gases cutting through a film of water on the lower plate producing a highly turbulent mist or mixture of water and gases between the two plates, the tray bottoms with the smaller holes present a greater peripheral edge per unit of area than the plates with the larger holes. Since the smaller holes are more susceptible to clogging, the gases first pass through the trays with the larger holes where most of the solids are removed and the most effective gas and water contact is provided where the fewest and most difficult particles to remove must be washed out.

There is a water pipe 20 extending along the center of the scrubber above the uppermost trays which discharges water into the top trays at both sides of the center. It is usually supplied with water from an elevated reservoir (not shown) capable of keeping up the supply of water for a period of time if there should be a power failure. In addition there are several spray nozzles 21 positioned below the trays of each level arranged to continuously spray the under surfaces of the trays to prevent the build-up of muck which otherwise forms around the holes on the undersides of the trays. Water may flow from an upper tray into a lower tray through the T-traps 22, the tops of which are below the level of the flanges 10. These traps permit the gravity flow of water but prevent the upflow of gases therethrough. As shown in FIG. 2 the traps have a collar 23 passing through the lower and upper plates to which the plates are welded while the curved pipe elements 24 screw into these collars.

As in other apparatus of this kind, the dirty water is cleaned and reused, but apparatus for this purpose is conventional and forms no part of the present invention, which for the first time, so far as I am aware, makes it possible to take advantage of the effective scrubbing action afforded by trays having a large number of small diameter holes therethrough without clogging through the use of a succession of spaced trays through which the gas rises wherein the sizes of the holes decreases upwardly in each successive tray but the number of holes increases. While I have given the specific dimensions of the holes in the several trays, this is by way of explanation and is typical of an effective relationship, but the invention is not to be considered as limited to these dimensions.

I claim:

1. Apparatus for removing particulate solids from a stream of gas comprising:
   a. a casing through which the gas to be cleaned flows upwardly,
   b. a plurality of water-receiving and retaining trays positioned across that casing at a plurality of vertically-spaced intervals through which the gas to be cleaned passes,
   c. each tray having a bottom with regularly-spaced holes therethrough and perforate means supported above the bottom providing spaced openings for the passage of gas therethrough separated by imperforate target areas over the holes in the bottom of the tray,
   d. the individual holes through the bottom of each tray being smaller in area than the holes in the bottom of the tray beneath but with the number of holes in the bottoms of the trays at each level being progressively greater and so arranged that the pressure drop across a tray at any level is substantially the same as that across a tray at any other level, e. said means providing the target areas of the respective trays being arranged to increase the number of target areas and decrease the spacing between said areas as the size of the holes in the tray where it is positioned decreases with respect to the tray below and its number of such holes increases, and f. means for spraying the undersurface of the bottom on each tray with water to keep it free of accumulated particulate material.

2. Apparatus for removing particulate solids from a stream of gas as defined in claim 1 wherein said means for providing spaced target areas comprises an impingement plate fixed above the tray bottom but below the level of the top of the tray with holes therethrough, the holes in each impingement plate being larger than the holes in the bottom of the tray in which the plate is positioned and with their centers spaced from each other the same distance as the centers of the holes in the tray bottom but with said centers offset with respect to the centers of the holes in the bottom of said tray in such manner that a solid area of said plate is directly above each hole in said tray bottom, the areas of the individual holes in the impingement plates also decreasing in area upwardly from the lowermost tray while the number of holes increases relative to the number of holes in the impingement plate of the next lower tray.

3. Apparatus as defined in claim 2 wherein there are three trays in vertically-spaced relation, the holes in the bottom of the lowermost tray being typically three-sixteenths of an inch in diameter and the distance between adjacent hole centers being seven-sixteenths of an inch, and in the bottom of the middle tray being one-eighth of an inch in diameter with the spacing between adjacent holes being five-sixteenths of an inch between centers and the bottom of the top tray being three thirty-seconds of an inch with the distance between adjacent hole centers being seven thirty-seconds of an inch; the spacing between the holes of the impingement plate of each tray being the same as the center-to-center spacing of holes in the bottom of the tray in which it is positioned, with the diameters of the holes in the respective impingement plates of the trays from bottom to top being typically nine thirty-seconds of an inch, three-sixteenths of an inch and nine sixty-fourths of an inch respectively.

* * * * *